(No Model.)

J. LYNCH.
UNDERGROUND CONDUIT.

No. 275,233. Patented Apr. 3, 1883.

Witnesses:
C. J. Bell
A. M. Tanner

Inventor:
John Lynch,
By Palmer Ladd,
Attorneys.

N. PETERS, Photo-Lithographer, Washington, D. C.

UNITED STATES PATENT OFFICE.

JOHN LYNCH, OF WASHINGTON, DISTRICT OF COLUMBIA.

UNDERGROUND CONDUIT.

SPECIFICATION forming part of Letters Patent No. 275,233, dated April 3, 1883.

Application filed January 27, 1883. (No model.)

*To all whom it may concern:*

Be it known that I, JOHN LYNCH, a citizen of the United States, residing at Washington, in the district of Columbia, have invented certain new and useful Improvements in Underground Conduits for Electrical Conductors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is, primarily, to provide a pipe or conduit for underground-telegraph wires, and in connection therewith it includes certain details of construction herein described, which may be used in connection with sewer, drain, and other pipes, as well as underground-telegraph pipes.

The invention consists in the combination of a base or supporting block having a concave seat for receiving the abutting ends of two pipe-sections, with a cap-piece or a semicylindrical shell which covers the upper halves of the pipe-sections, and is let into notches or apertures made in the base or supporting block. The inner faces of the supporting-block and the cap-piece are provided with transverse grooves or channels, which coincide with circumferential grooves made in the pipe-sections, and form seats for receiving cement or other indurating plastic material for uniting them with the pipe-sections.

Figure 1:
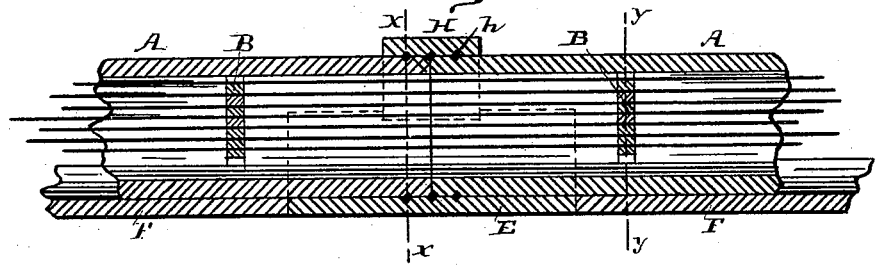
Figure 2:
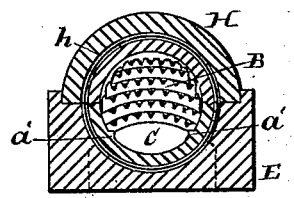
Figure 3:
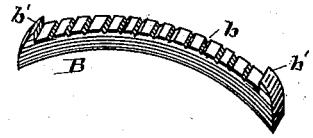
Figure 4:
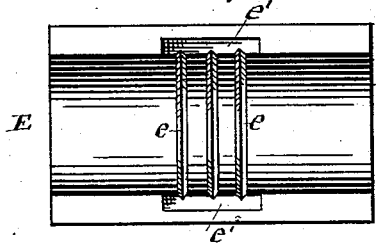
Figure 5:
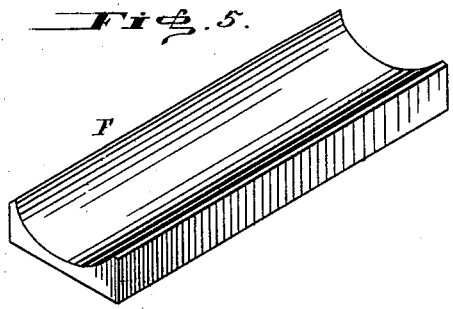
Figure 6:
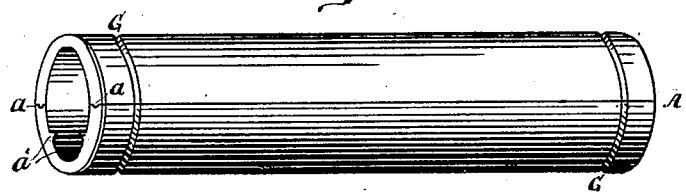
Figure 7:
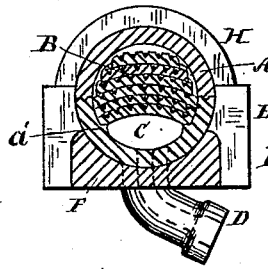

In the drawings, Figure 1 is a longitudinal section of an underground telegraph constructed according to the present invention. Fig. 2 is a transverse section of the same on the line *x x*. Fig. 3 is a detached view of one of the supporting-racks for the wires. Fig. 4 is a plan or top view of the supporting block or base for the joints. Fig. 5 is a perspective view of one of the bed-blocks placed between the joint bed-blocks. Fig. 6 is a perspective view of a split pipe having circumferential grooves and chamfered ends. Fig. 7 is a cross-section on the line *y y*, and showing one of the drain-pipe branches.

The pipes A are split pipes made of terracotta, earthenware, hardened cement, or other material used in the construction of sewer, water, and other pipes, and the two sections are respectively made with a tongue and groove, *a*. On the inside of one of the half-sections (the half which forms the bottom) are formed two ridges or ledges, *a'*, for the purpose of supporting the racks B. These wire-supporting racks are formed of a number of straight or curved pieces, which are preferably made of terra-cotta, but may be of any material of the shape shown in detail by Fig. 3. The wires rest in the grooves *b*, and the lugs *b'* are to hold the ends of the next succeeding rack. The racks rest one on top of another, the bottom of the series being supported on the ledges *a'*. For the lower members forming a nest or set of racks no end lugs are required, as the ends of the racks rest against the walls of the pipe; but when the middle of the pipe is passed some engaging device between the racks is necessary to hold them in place independent of the pipe.

It will be seen that an open channel, *c*, is left beneath the wires for the drainage of water that may leak through into the pipe, and at the proper places I insert a pipe-section having a branch, D, which is connected with the sewer. The telegraph-pipes will not, as a rule, be laid as deep as the sewer-pipes, wherever the former are laid in the neighborhood of the latter, and the branch connections are placed at the lowest points in the grade of the telegraph-pipes, or at proper intervals when there is a long stretch of level pipe.

I lay a foundation for the pipes of base blocks or plates E and F, the former being laid beneath the joints and the latter under the pipes between the blocks E. These base-blocks have flat bottoms and concave seats in which the pipes rest, and are made of the same material as the pipes. They are easily laid, and form a firm foundation for the pipes. When these base-blocks are used it is not necessary to use as heavy pipe as would otherwise be required. The abutting ends of the pipe-sections are chamfered at their outer edges, so that when placed together a V-shaped groove will be formed between said abutting ends completely around the pipe. A circumferential groove, G, is made in each pipe-section, near its chamfered end, as is clearly shown in Fig. 6. A cap-piece or semi-cylindrical shell, H, made of the same material as the base-blocks, is placed on the upper halves of the pipe-sections, and is provided with transverse grooves $h$ on its inner face, which are of a V or other shape, and coincide or register with corresponding grooves, $e$, in the base or supporting block. The cap-piece is made shorter than the supporting-block, and the latter has vertical notches and shoulders $e'$, made at the sides of its top portion, for receiving the ends of the cap-piece and supporting the same. The cap-piece, however, may be of the same length as the base or supporting block, and be provided with bottom projections, which enter the notches $e'$ in the block.

The manner of laying the pipes is as follows, viz: The bed-blocks having been laid, the concave seats and grooves of the blocks E are lined with a plastic cement or indurating material and the bottom halves of the pipes laid in place. The cement enters the circumferential grooves of the pipe-sections, and forms a tight joint between the lower halves of the pipes and the base or supporting blocks E. The wire-racks B are then successively placed in position, and the wires laid in their seats until all are in place, when the upper halves of the pipes are laid on. The longitudinal joints between the halves of the pipes may be cemented; but in order to allow for the pipe being opened for repairs it is preferably not cemented, the provision made for drainage being sufficient to keep the pipe dry. A coating or layer of cement is applied to the upper halves of the pipes at the vertical joints, and the grooves in the latter are filled with cement, and when the cap-piece is placed in position the cement enters the grooves in said cap-piece and forms a tight joint.

It will be manifest that the coupling-joint is applicable to sewer, drain, and other pipes, as well as those used for telegraph-wires; and when so used in connection with whole pipe it forms a gas and liquid tight joint. The cement cannot get inside of the pipes when they are being laid. Consequently the flow of water is unobstructed and a strong and tight joint secured. Also, that the base-blocks F may be dispensed with and the pipes laid with only the blocks E and cap-pieces H over the joints.

What I claim as new, and desire to secure by Letters Patent, is—

1. The combination of the base-block having a concave seat, transverse grooves, and ledges or shoulders at the ends of the latter, and the curved cap or shell supported upon said ledges or shoulders, and provided with transverse grooves, with two pipe-sections having circumferential grooves at their abutting ends, and seated in the grooved portion of the supporting-block, beneath the grooved cap, and a cement filling applied between the pipe-sections, base-block, and cap, substantially as and for the purpose set forth.

2. The combination of the grooved base-block and grooved cap-piece supported thereon, and the longitudinally divided or split pipe-sections having their joint or abutting portions provided with circumferential grooves, and seated in said grooved base-block, the cement filling applied between the pipe-sections, base-block, and cap, and the blocks or plates having concave seats arranged between the grooved base-blocks and supporting the pipes between the joint portions thereof, substantially as herein set forth.

In testimony whereof I affix my signature in presence of two witnesses.

JOHN LYNCH.

Witnesses:
A. C. RICHARDS,
STORY B. LADD.